DIGITALLY POSITIONED WAVE FILTER

Filed Dec. 18, 1959 3 Sheets-Sheet 1

INVENTORS
JOHN E. BENNETT
STANLEY A. FIERSTON
BY Spencer E. Olson
ATTORNEY

INVENTORS
JOHN E. BENNETT
STANLEY A. FIERSTON
BY Spencer E. Olson
ATTORNEY

DIGITALLY POSITIONED WAVE FILTER

Filed Dec. 18, 1959 3 Sheets-Sheet 3

INVENTORS
JOHN E. BENNETT
STANLEY A. FIERSTON
BY Spencer E. Olson
ATTORNEY

United States Patent Office 3,095,539
Patented June 25, 1963

3,095,539

DIGITALLY POSITIONED WAVE FILTER

John E. Bennett, Clarence, N.Y., and Stanley A. Fierston, Lynn, Mass., assignors to Sylvania Electric Products Inc., a corporation of Delaware Filed Dec. 18, 1959, Ser. No. 860,511
8 Claims. (Cl. 325—163)

This invention relates to apparatus for generating an output signal having a selectable constant frequency deviation from the frequency of a carrier signal, and more particularly to a filter system for use with such apparatus capable of following abrupt changes in frequency of the output signal.

In a number of communication systems known to the art, it is necessary to provide a plurality of carrier signals of different frequency, each related to the other in a specified manner. For example, in some frequency shift keying teletypewriter systems, successive marks and spaces are transmitted at differing frequencies, and other systms of which applicants are aware utilize a large number of different frequency channels on which intelligence is transmitted, it being necessary to rapidly switch from one frequency to the other in some programmed or pseudo-random fashion, not necessarily from one channel to an adjacent channel. That is, it may be necessary to shift from a frequency near the lower edge of a band of frequencies to a channel near the upper edge of that band, and then back to a channel near the middle of the band, and so on. Additionally, the requirement usually exists that the time for switching from one channel to the other, regardless of their relative positions in the frequency band, be substantially the same.

An eminently suitable circuit for generating signals having the foregoing characteristics is described in application Serial No. 596,350, filed July 6, 1956, by Madison G. Nicholson, Jr. entitled "Generator of Frequency Increments," now Pat. No. 2,923,891, dated February 2, 1960, and assigned to the assignee of the present application. Basically, the apparatus described in this patent comprises a source of unmodulated carrier signal, means for producing from the unmodulated carrier a plurality of carriers each having a frequency identical with that of the unmodulated carrier but having discrete phase differences over the range from a zero reference phase through 360 electrical degrees at the carrier frequency. These phase-displaced carrier signals are conveniently produced by a multi-section delay line to one end of which the carrier signal is applied. The apparatus further includes a plurality of switches, equal in number to the taps on the delay line, each controlling a respective one of the progressively phase-displaced carrier waves. Each of the switches is connected to an output circuit and is operative to transmit the respective applied carrier wave to the output terminals only in response to the application thereto of a unique switching signal. A switching signal having a waveform of such characteristics as to actuate the switches in unidirectional sequence from one end of the delay line to the other is continuously applied in parallel to all of the switches whereby during each full cycle of the switching signal the progressively displaced carrier waves are sequentially coupled to the output circuit. Thus, if the switches are actuated in the direction of progressively retarded phase, one cycle per second is subtracted from the frequency of the original unmodulated carrier wave for each complete cycle of the switching signal. So long as the switching signal is continuously applied, the frequency of the signal appearing at the output terminals differs from the frequency of the unmodulated carrier by an amount equal to the frequency of the switching signal. For example, if the frequency of the unmodulated carrier signal were one megacycle, i.e., one million cycles per second, and the switching signal has a frequency of one thousand cycles per second, and as before, assuming a switching direction in the direction of progressive phase retardation, the resultant output signal would have a frequency of 999,000 cycles per second. To obtain a different frequency, the frequency of the switching signal is changed; for example, if it were desired to generate an output signal having a frequency of 995,000 cycles per second, the frequency of the switching signal would simply be changed to 5000 cycles per second.

In one embodiment, the switching signal is of sawtooth waveform having a unidirectional variation in voltage from a minimum value within the range of amplitude necessary for switching the first switch in the sequence and a maximum value falling within the range for operation of the last switch in the sequence. However, as pointed out in the aforesaid application, the switching signal is readily synthesized from a recurring train of pulses; i.e., the system is readily adaptable to a digital form of operation. A typical example of digital operation is an eight position electronic selector switch energized by eight carrier signals distributed in phase from zero degrees to 315° in 45° steps. In a simplified version, the switch may be arranged to advance one position each time a single pulse is applied to the switch. If before the application of a pulse, the switch is at position zero, after the application of one pulse it will be in position one, a second pulse will step it to position two, and so on, to position seven for the seventh pulse. The eighth pulse will select position zero so if regarded as a rotary switch, one complete revolution is completed each time a total of eight pulses are applied. The overall results of the application of a series of eight pulses to the electronic switch is to change the frequency of the carrier, as observed at the output terminals, by one complete cycle. Thus, for example, if precisely 8000 pulses were applied each second, the output frequency would differ from the unmodulated carrier frequency by precisely 1000 cycles per second, the frequency of the output signal being above or below the frequency of the unmodulated carrier depending upon the direction of switching.

In another form of digital operation of the circuit, a synthetic sawtooth waveform having finite amplitude steps may be generated from a series of pulses. This kind of waveform is readily obtained from conventional digital counters. As an example, a three-stage binary counter (count of eight) will produce an eight-valued "stair-step" waveform. Thus, for each pulse applied to the counter input, the phase of the carrier wave selected from the delay line will be advanced (or retarded) by 45°. If the pulses applied to the three-stage counter are at a uniform rate, the signal at the output terminals will have a frequency differing from the frequency of the unmodulated carrier by one-eighth of the pulse rate. Thus, the frequency of the output signal may be selectably controlled simply by altering the repetition rate of the input pulse train, which can be done in a very precise manner.

However, the rapid switching from one tap of the delay line to the next introduces unwanted modulation side bands on either side of the desired frequency. For satisfactory multi-channel operation it is desirable that the output signal at each discrete frequency be "clean"; that is, that the unwanted moduation sidebands be removed. Theoretically, this might be accomplished by applying the output signal to a multi-channel filter having as many narrow filter channels as frequencies to be generated, each tuned to a respective one of the output frequencies, but it will be obvious that in a system requiring fifty or a hundred different frequency channels such a filter system would be prohibitively complex and expensive.

In accordance with the present invention, filtering of the plural output signals of differing frequencies is performed by a single filter coupled to the output terminals of the generator and operative to "track" the shifts in frequency at the output of the generator. To achieve this result, the characteristics of the filter are changed rapidly in response to the digital information utilized to alter the frequency of the signal generator such that the center frequency of the filter is positioned at the frequency of the then generated output signal. The single filter includes as one of the frequency determining elements a voltage variable semi-conductor capacitor across which is applied a voltage having an amplitude bearing a predetermined relationship to the frequency of the output signal. In the digitally controlled system, the binary word used to determine the output frequency of the generator is converted in a suitable digital-to-analog converter to an analog signal to be applied across the voltage variable capacitor. Consequently, as a new binary word is applied to alter the frequency of the output signal, the center frequency of the filter is simultaneously moved in position to accommodate the frequency of the output signal corresponding to the new command word.

Accordingly, it is a general object of the present invention to provide a filter which is electronically tunable in discrete intervals over a wide frequency range.

Another object of the invention is to provide an electronically tunable filter the center frequency of which may be positioned in response to a digital command word.

Another object of the invention is to provide an improved generator of discrete signal frequencies differing from each other by controllable amounts.

Other objects, features and advantages of the invention will be apparent from the following detailed description taken in conjunction with the accompanying drawings in which.

Figure 2A:
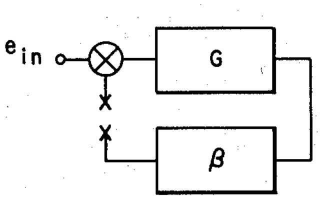
FIGS. 2*a*, 2*b* and 2*c* are equivalent circuit diagrams useful in explaining the operation of a portion of the circuit of FIG. 2.
Figure 2B:
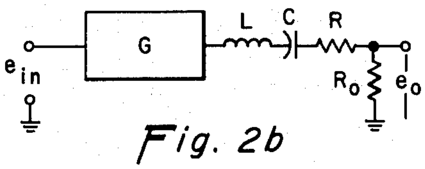
Figure 2D:
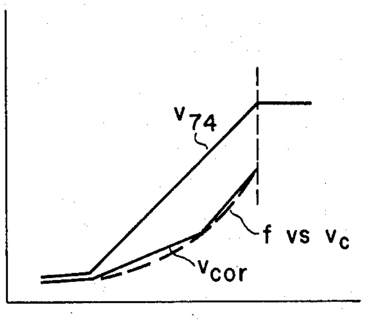
FIG. 2 is a circuit diagram, partially in block diagram and partially in schematic form illustrating a first embodiment of a filter circuit and digital-to-analog converter.
Figure 2C:
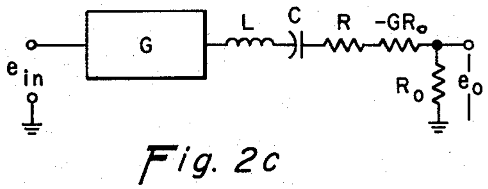
Figure 2:
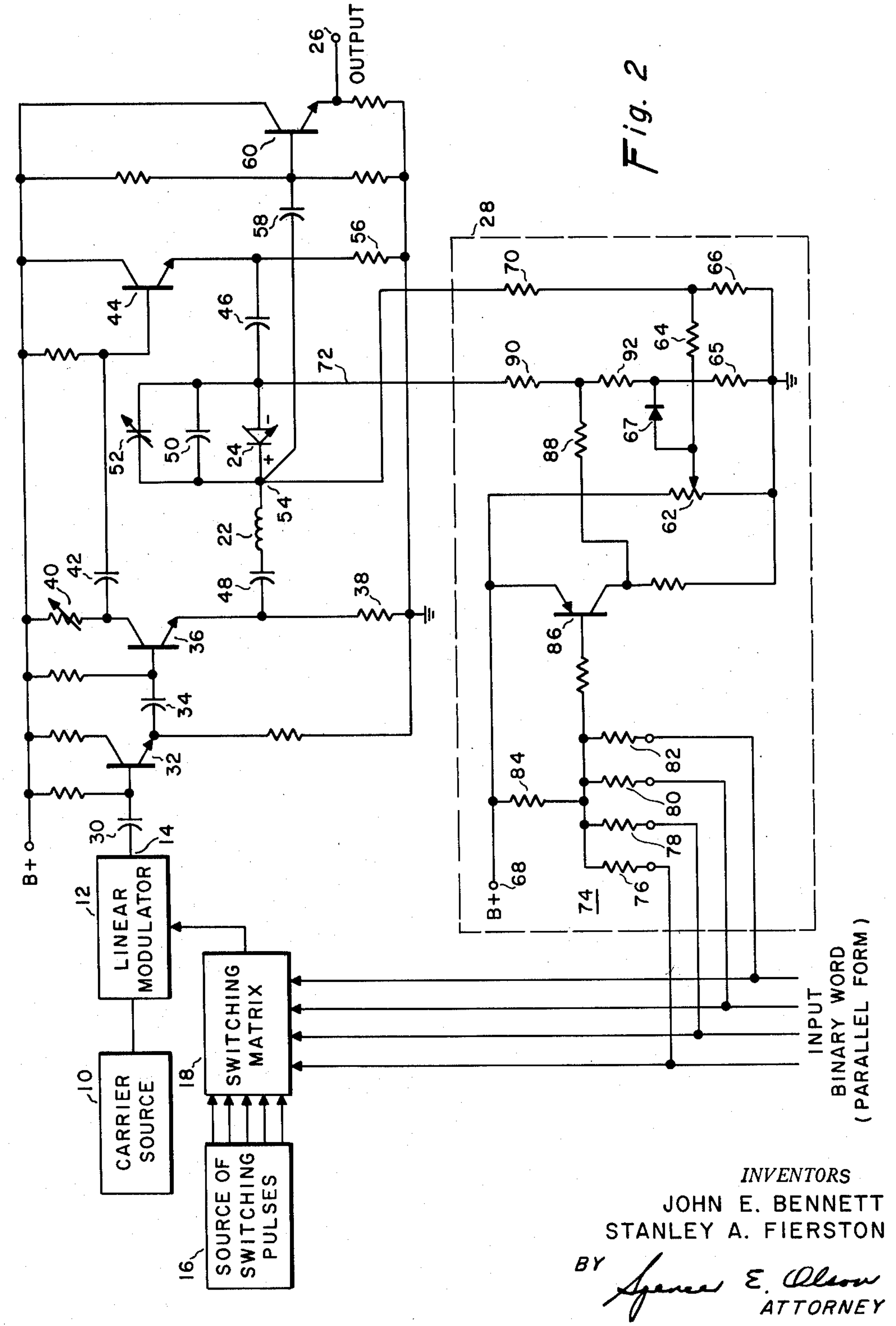
Figure 3:
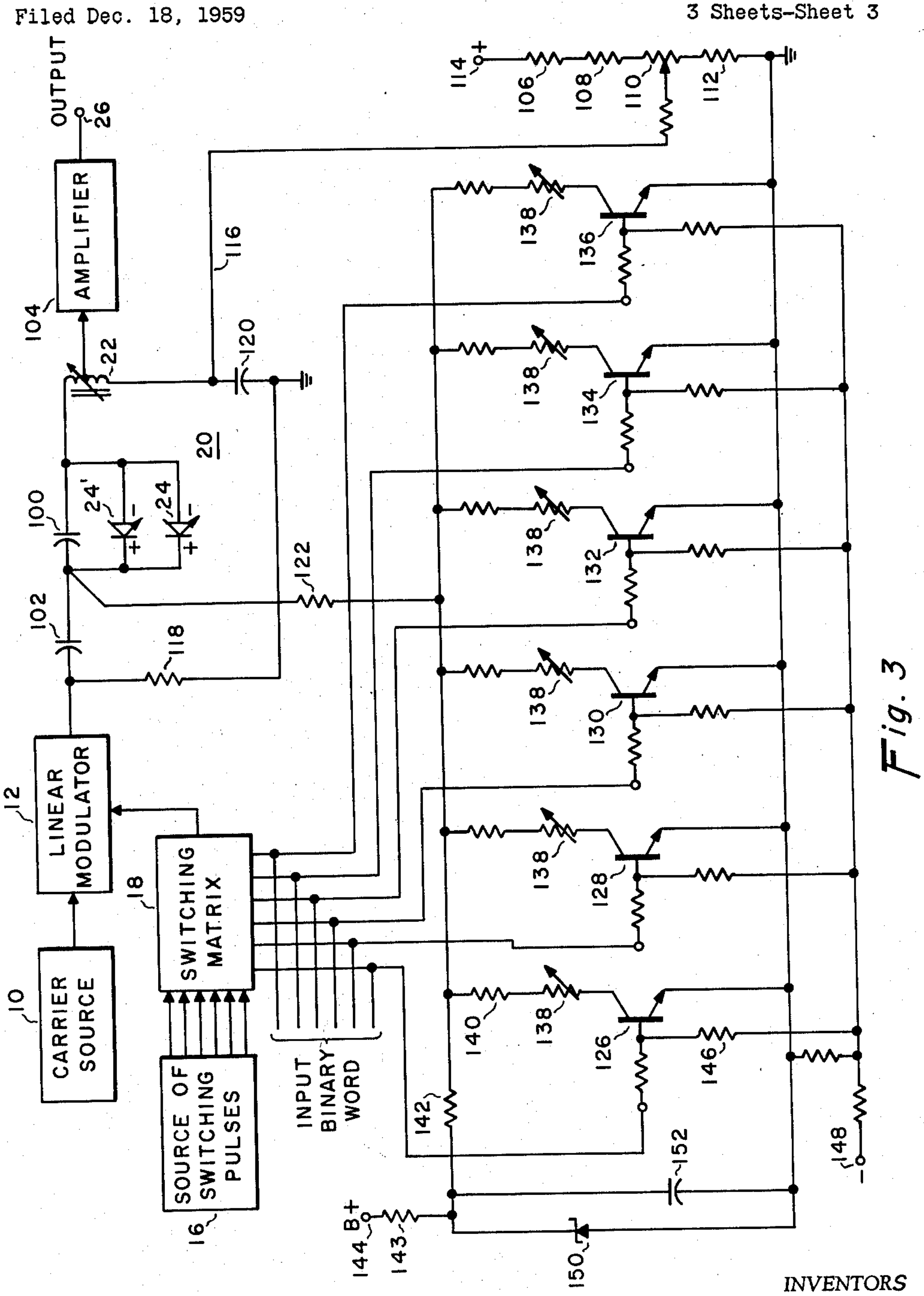

FIG. 2*d* is a series of curves useful in explaining the operation of another portion of the circuit of FIG. 2; and FIG. 3 is a schematic circuit diagram, partially in block diagram form and partially schematic illustrating another form of filter circuit and digital-to-analog converter.

Figure 1:
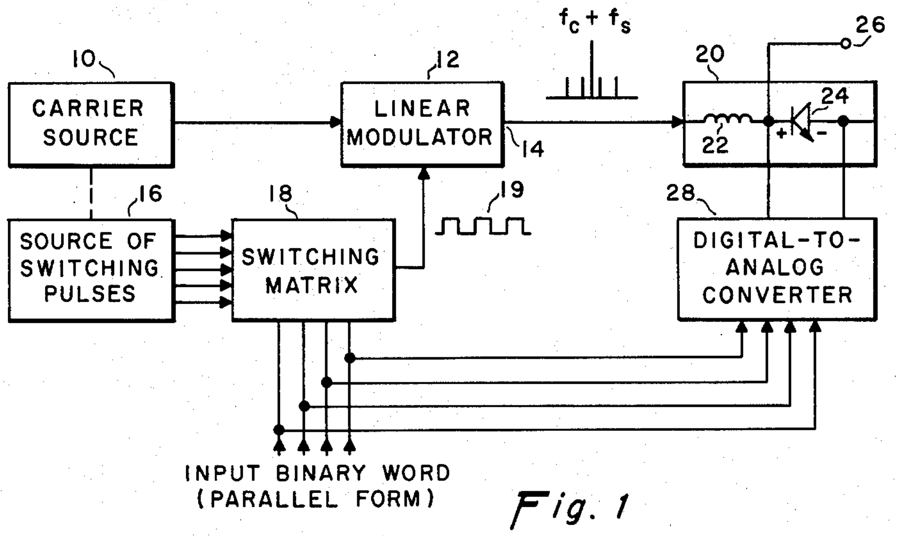
FIG. 1 is a block diagram of a signal generator embodying the invention.

FIG. 1 diagrammatically illustrates the generator of frequency increments disclosed in the aforesaid Nicholson patent, to which attention is directed for a complete description of its operation, and the operation of alternative embodiments. Briefly describing its operation, an unmodulated carrier from a source 10 is applied to a circuit 12 which has been termed a linear modulator. The linear modulator may include a multi-tapped delay line to one end of which the carrier signal is applied and the other end of which is terminated in its characteristic impedance. A plurality of switches are connected between corresponding ones of the taps and an output terminal 14 and are arranged to couple and decouple in a prescribed unidirectional sequence and in a cyclic manner the progressively phase displaced carrier waves appearing at the taps of the delay line.

The switches are preferably actuated by a train of pulses, the repetition frequency of which determines the frequency of the signal at output terminal 14. A plurality of frequencies are thus obtainable from the fixed frequency carrier source 10, the deviation frequency being precisely controllable by altering the repetition frequency of the train of pulses. This is conveniently accomplished by providing a source 16 capable of producing a plurality of pulse trains having different repetition frequencies related to each other in the manner it is desired the increments in output frequency at terminal 14 be related. It may be desirable to use the frequency of source 10 as a reference for the derivation of the pulse train frequencies. The plurality of pulse trains are applied to a switching matrix 18 arranged to select a particular train of pulses 19 upon command of a binary word of N digits (four in the illustrated example) for application to linear modulator 12. Individual ones of the pulses in the train 19 may be used directly to step from switch to switch (see FIG. 4 of the above-entitled application), or the pulses may first be applied to a suitable binary counter circuit (FIG. 2 of the Nicholson application) to generate a stepped sawtooth waveform switching signal. With each cycle of switching of all of the taps on the delay line in a unidirectional sequence from one end of the delay line to the other, one complete cycle is added to or subtracted from the signal from carrier source 10, and appears at output terminal 14. If, for example, the switching sequence is repeated one thousand times per second, as determined by the repetition frequency of the pulse train 16, the frequency of the signal appearing at terminal 14 differs from that of the carrier by 1000 cycles per second. Whether the frequency of the output from the modulator 12 is above or below the frequency of the carrier is determined by the direction of switching along the delay line. Thus, if the frequency of the carrier is $f_c$, the frequency of the output signal is $f_c$ plus $f_s$ (or $f_c - f_s$), $f_s$ being the cyclic switching frequency. The output signal is predominately a sine wave of frequency $f_c$ plus $f_s$ as shown, but because of modulation sidebands introduced in the operation of the linear modulator 12, unwanted frequencies of smaller amplitude than the desired frequency also appear in the output signal. It is desirable that the unwanted signals be eliminated from the output signal.

In accordance with the invention, the signal appearing at output terminal 14 is applied to a filter circuit 20, diagrammatically shown as a series tuned circuit comprising an inductance 22 and a capacitor 24. Capacitor 24 is a voltage variable semi-conductor capacitor consisting of a P-N junction formed in single-crystal silicon by techniques used in the manufacture of semi-conductor devices. At a P-N junction the density of charge carriers is reduced virtually to zero when a voltage is applied across the junction in the reverse direction from that causing easy current flow. As the voltage increases, the region of zero carrier density, known as the depletion region, gets wider. In effect this moves apart the two conducting carriers and decreases the capacity as if there were two metal plates separated by a dielectric whose thickness was variable. The area of the plates remains the same; the dielectric constant is unchanged; but the thickness of the dielectric varies according to the applied voltage. This voltage variable capacitor is available from the Hughes Aircraft Company, Los Angeles 45, California, and from Pacific Semiconductors, Inc. who designate their device "Varicap." Accordingly, in the circuit of FIG. 1, as the voltage applied across the capacitor 24 is varied, the point of resonance of the series LC circuit correspondingly changes. In accordance with this invention, the voltage applied across the capacitor 24 is functionally related to the binary word utilized to select the frequency of the pulse train 19, which, in turn, determines the frequency of the output of the linear modulator, in a manner such that the center frequency of the filter 20 always corresponds to the frequency of the output signal. Accordingly, by selection of filter circuit parameters to insure a very narrow pass band, the unwanted sidebands in the output signal from the linear modulator can be substantially eliminated. Thus, the signal appearing at the output terminal 26 is essentially a pure signal of frequency $f_c \pm f_s$.

The voltage for application to the voltage variable capacitor 24 is obtained by the conversion of the binary command word applied to the switching matrix 18 to an analog voltage by also applying the binary word in parallel to a digital-to-analog converter 28. The output of converter 28 is an analog voltage signal having an amplitude proportionate to the input binary word, and, since the binary word controls the output frequency of linear modulator 12, the analog signal is also proportional to $f_c \pm f_s$.

FIG. 2 illustrates a specific form of a narrow pass-band filter and a rather elementary digital-to-analog converter in combination therewith. Without again going through the operation of the signal generator comprising the linear modulator and its operation on the carrier source, the output of the linear modulator is coupled via capacitor 30 to the base of transistor 32 employed as an emitter follower. The primary function of the emitter follower is to isolate the remainder of the circuit from the linear modulator and for impedance transformation. The output from the emitter follower is coupled via capacitor 34 to the base of transistor 36, the emitter and collector of which are respectively connected through resistors 38 and 40 to ground and a source of positive potential. The signal appearing at he collector of transistor 36 is coupled via capacitor 42 to the base of transistor 44, also connected as an emitter follower, the output of which is coupled via capacitor 46 to one end of a series tuned circuit including inductance 22 and voltage variable capacitor 24. A fixed capacitor 50 and a trimmer capacitor 52 are connected in parallel with the voltage variable capacitor 24 to establish a basic value of capacitance in the resonant circuit from which to tune. The inductance 22 is connected via capacitor 48 to the emitter of transistor 36 thus completing a feedback loop, including the series tuned circuit with its voltage variable tuning capacitor. At the resonant frequency of the tuned circuit, the signal returned to the emitter of transistor 36 is 180° out-of-phase with the signal on the base of transistor 36 and the circuit is regenerative. The amount of regeneration may be controlled by adjustment of the value of resistor 40 in the collector circuit of transistor 36.

The bandwidth of the filter is controlled by controlling the amount of regeneration, as may be seen from the following network analysis and FIGS. 2*a*, 2*b* and 2*c*:

First consider the feedback loop to be open (FIG. 2*a*) with G representing the gain from the base to the collector of transistor stage 36, and $\beta$ representing the transfer function of the series resonant circuit. The circuit may be shown as FIG. 2*b*, where R is emitter output resistance of transistor 44 plus L and C losses, and $R_0$ is the emitter input resistance of transistor 36. Note the positive loss resistance which degrades circuit Q and widens circuit bandwidth:

$$\text{Circuit B.W. (radius)}=\frac{\text{center frequency}}{\text{circuit Q}}=\frac{W_0}{\frac{W_0 L}{R+R_0}}=\frac{R+R_0}{L} \quad \text{(Eq. 1)}$$

To combat this bandwidth widening due to loss resistance, a negative resistance is inserted in series with the positive loss resistance through the mechanism of regeneration. Writing the equation of the circuit of FIG. 2*b* in operational form:

$$\text{Open loop gain}=\frac{GS\frac{R_0}{L}}{S^2+S\frac{(R_0+R)}{L}+1/LC}=\beta G \quad \text{(Eq. 2)}$$

$$\text{Closed loop gain}=\frac{\beta G}{1-\beta G}=\frac{GS\frac{R_0}{L}}{S^2+S\left(\frac{R_0+R-GR_0}{L}\right)+\frac{1}{LC}} \quad \text{(Eq. 3)}$$

Working backwards from this equation, the equivalent circuit of FIG. 2*c* may be derived. Note the effective negative resistance in series with the positive loss resistance the circuit bandwidth becomes $$\frac{W_0}{\frac{W_0 L}{R+R_0-GR_0}}=\frac{R+R_0-GR_0}{L} \quad \text{(Eq. 4)}$$

Thus, the positive feedback effectively places a negative resistance in series with the positive loss resistance of the resonant circuit. As the gain is increased (by increasing resistor 40), circuit bandwidth is reduced in accordance with Equation 4. When the effective negative resistance is increased until it balances out the positive loss resistance, the circuit verges on oscillation. This point represents the limit of stable operation for the filter.

The output from the circuit just described is taken from the junction 54 of the inductance 22 and capacitor 24 of the series tuned circuit. It is to be noted that one end of inductor 22 is connected through capacitor 48, which is relatively large, and resistor 38, which is of relatively low value, to ground. Similarly, the other end of the series tuned circuit is connected through a relatively large capacitance 46 and a relatively small resistor 56 to ground. At the frequencies at which the system is intended to operate, these two capacitor-resistor combinations are effectively a short circuit. Therefore, looking into junction 54, the circuit appears to be a parallel tuned circuit since both the inductor and capacitor are effectively grounded at their ends for A.C. As is well known, a parallel tuned circuit when energized by a voltage whose frequency is at the resonant frequency of the tuned circuit, gives maximum voltage response at resonance. Therefore, when a signal having a frequency equal to the frequency to which the filter is tuned is applied to the circuit, the voltage at junction 54 is maximum. The output signal is coupled via capacitor 58 to the base of transistor 60, connected as an emitter follower, whereby an output signal is derived at terminal 26.

The resonant frequency of the filter is adjusted by varying the voltage applied across the voltage variable capacitor 24. A reference potential is coupled via resistor 70 to one terminal of the capacitor (at junction 54) from a voltage divider including potentiometer 62 and resistors 64 and 66 connected between a source of positive potential at terminal 68 and ground. This reference voltage may be adjusted by potentiometer 62 to set the voltage variable capacitor for operation over a desired portion of its voltage-capacitance characteristic. A voltage having an amplitude proportional to the input binary word, derived by the digital-to-analog converter 28, is coupled via conductor 72 to the other terminal of capacitor 24. As was noted earlier, the amplitude of the analog voltage signal is thus functionally related to the frequency of the signal applied to the filter from linear modulator 12.

The binary word, applied in parallel form, consists of N voltage levels representing "zeros" and "ones" and may be derived from the plates of a group of multivibrator circuits. For proper operation of the digital-to-analog converter (to be described) the binary word applied to the input lines must all have the identical maximum and minimum voltage values. That is, if a "one" on one of the lines is 10 volts for example, a "one" on any other of the lines must also be 10 volts. Likewise, if a "zero" on one line is represented by 2 volts, it must be similarly represented on the other lines. The binary word, represented by these voltage levels, is applied in parallel form to a so-called Kirkhoff voltage divider network 74 consisting of a number of resistors 76, 78, 80 and 82 having progressively increasing resistance value in accordance with a binary progressive sequence. That is, resistor 76 has a value of R, resistor 78 has a value 2R, resistor 80 has a value 4R and resistor 82 has a value 8R. Should additional resistors be used in the matrix, their values would be 16R, 32R, etc. The common junction of these resistors is connected to a source of positive potential at terminal 68 through resistor 84. The voltage output of this matrix, developed across resistor 84, has an amplitude directly proportional to the binary number applied to it. The analog voltage derived from this conversion is applied to the base of transistor 86, provided for power amplification and impedance matching purposes, and then applied through resistors 88 and 90 and conductor 72 to the voltage variable capacitor.

Resistors 88, 92, 64, 62, 65 and 66 in conjunction with diode 67 comprise a non-linear shaping network for converting the substantial linear binary number vs. analog output voltage characteristic of matrix 74 to the non-linear resonant frequency vs. control voltage characteristic of the series resonant circuit including voltage variable capacitor 24. Referring to FIG. 2*d*, the latter characteristic over the frequency range of interest is illustrated as the smooth dotted line designated "$f$ vs. $v_c$." The substantitally linear curve designated $V_{74}$ is the binary vs. analog characteristic of the matrix, which, in the absence of correction, would appear at the collector of transistor 86. The shaping circuit functions to convert the output of the matrix to a two-segment straight line characteristic, designated $v_{cor}$, which approximates the curve $f$ vs. $v_c$, the position of the knee of the curve being adjustable by potentiometer 62. This method of "curve matching" has been found sufficiently accurate for operation of the filter over a moderate frequency range. For operation over a wider range, the circuit may be modified to provide a three or more segment approximation of the characteristic $f$ vs. $v_c$. Thus it is seen that the voltage applied to the voltage variable capacitor, after the aforementioned correction, is functionally related to the digital word applied to the converter, this binary word also controlling the output frequency of linear modulator 12. Consequently the resonance frequency of the filter is varied simultaneously with discrete changes in frequency of the output signal from the signal generator, whereby the filter pass-band follows the changes in frequency of the signal applied to it.

FIG. 3 is a circuit diagram, partially schematic and partially in block diagram form, of another system embodying the invention. As in the system of FIG. 2, the output of the linear modulator 12 is applied to the filter 20, which in this case is somewhat simpler than the circuit of FIG. 2, comprising a series resonant circuit of an inductor 22 and two variable voltage capacitors 24 and 24′ in parallel with a capacitance setting capacitor 100. In the system for which the filter was designed, it was found that two voltage variable capacitors in parallel afforded the necessary range in capacitance to permit tuning over the desired range of 30 kilocycles using a voltage range on the capacitors of approximately 1.5 to 5 volts. The input signal is coupled to the filter by a capacitor 102, and the output is derived from a tap on inductor 22. As in the circuit of FIG. 2, the output at the tap on inductor 22 is maximum at resonance of the series LC circuit. After amplification at 104 the filtered output appears at terminal 26.

A reference voltage for the voltage variable capacitors is derived from a voltage divider including resistors 106, 108, potentiometer 110 and resistor 112 serially connected from a source of positive potential at terminal 114 to ground. One of the resistors in the voltage divider chain is preferably a temperature compensating resistor whereby the reference voltage applied to the voltage variable capacitors changes to compensate for the effect of temperature on the capacitors themselves. The reference voltage, which may be adjusted by potentiometer 110, is coupled to one terminal of the capacitors over conductor 116.

The control voltage for the capacitors 24 and 24′ is derived from a digital-to-analog converter shown in the lower portion of FIG. 3 and having a function generally similar to the matrix 74 of the circuit of FIG. 2. This control voltage, which has an amplitude proportional to the binary word which determines the frequency of the output signal from linear modulator 12, is applied over conductor 122 to the other terminal of capacitors 24 and 24′. As in the system of FIG. 2, the binary word applied to the switching matrix 18 to select the desired pulse rate from source 16 to control the frequency of the output from linear modulator 12 is also applied to the digital-to-analog converter. In the illustrated example, the binary ward has six digits, contrasted with the four digit word shown in FIG. 2. The digits of the binary signal, which has the same maximum or minimum voltage levels on all lines for "zeros" and "ones," respectively, are applied through suitable coupling resistors to the base electrode of transistors 126, 128, 130, 132, 134 and 136. The collectors of each of transistors 126 through 136 are connected through a variable resistor 138, a fixed resistor 140, and a common resistor 142 to a source of positive potential at terminal 144. The emitter of each of the transistors is connected to ground, and the base electrode is biased negatively by virtue of the connection through resistor 146 to a source of negative potential at terminal 148. Thus biased, the transistors are conducting when a positive-going voltage representing a binary "zero" is applied to the base, and is adapted to be switched off when a negative-going signal (representing a binary "one") is applied. Thus, with all transistors conducting (representing all zeros) a predetermined voltage is developed across resistor 142, and as one or more of the transistors are cut off the voltage developed across resistor 142 increases. By adjustment of the value of resistor 138 in each of the transistor circuits, the contribution of each of these parallel circuits to the voltage developed across resistor 142 can be adjusted such that the curvature of the voltage characteristic developed across resistor 142 may be made to match the non-linear resonant frequency vs. control voltage characteristic of the series resonant circuit including voltage variable capacitors 24 and 24′. It will be noted that conductor 122 is connected to the junction of the resistors in the parallel switching circuits with the common resistor 142. It has been noted that in this disclosed embodiment only six bits of information are employed to determine the shape of the charactertistic of the control voltage for the voltage variable capacitors. In some applications it may be desirable to use binary command words having more or less digits as dictated by the tuning requirements of the system.

In order that the digital-to-analog converter produce an accurate analog reproduction, it is important to provide stable supply voltages for the transistor switching circuits. This is accomplished in the disclosed circuit by a Zener diode 150 connected in series with resistor 143 between the terminal 144 or the source of positive potential and ground, and capacitor 152 connected in parallel with the Zener diode. The Zener diode 150 functions much like a voltage regulator tube, resistor 143 dropping the voltage at terminal 144 sufficiently to insure operation of the diode in its regulating region. The capacitor 152 provides filtering to further stabilize the voltage appearing at the junction of resistors 142 and 143.

Tests of the circuit of FIG. 3 indicate that it will accept an input signal having unwanted frequencies of significant amplitude and produces at output terminal 26 a signal of substantially exact frequency as determined by the digital command word. The amplitude of the output signal varies no more than 3 db under the worst conditions to which the system is to be subjected; for example, changing the frequency of the output signal of modulator 12 abruptly from one end of the band to the other, a two to one change in amplitude of the input signal, and expected variations in the temperature of the ambient to which the circuit will be subjected.

From the foregoing, it is seen that applicants have provided a filter system which may be tuned in response to the command of a digital word. The filter finds particular utility in a frequency shift keyed communication system since the tuning thereof is, in effect, ganged to the control which determines the frequency of the output signal, thus permitting the use of a single filter in a multi-channel system. Two specific embodiments of the invention have been illustrated and described, but it will be evident that the invention is not limited to the specific circuits shown herein but that the novel concept and underlying principle of the invention is susceptible of numerous variations and modifications coming within the broader scope and spirit of the invention as defined in the appended claims. The specification and drawing are therefore to be regarded as illustrative rather than in a limiting sense.

What is claimed is:

1. A digitally positioned filter comprising, in combination, a tuned circuit including a voltage variable capacitor, a digital-to-analog converter coupled to said voltage variable capacitor, and means for applying a binary word to said converter.

2. A filter tunable in response to a digital word comprising, in combination, a tuned circuit including an inductance and a voltage variable capacitor having a pair of terminals, means for applying a reference voltage to one terminal of said voltage variable capacitor, and means for applying a voltage to the other terminal varying in accordance with a binary word comprising a digital-to-analog converter connected to said other terminal, and means for applying a binary word to said converter.

3. A filter tunable in discrete steps in response to binary command words comprising, in combination, a series tuned circuit including a capacitor the capacitance of which varies in response to the voltage applied thereacross, means for applying a reference voltage to one terminal of said capacitor, a digital-to-analog converter the output of which is applied to the other terminal of said capacitor, and means for applying binary command words to said digital-to-analog converter.

4. A filter tunable in discrete steps in response to binary command words comprising, in combination, a series resonant tuned circuit including an inductor and a capacitor the capacitance of which varies in a non-linear manner in response to the voltage applied thereacross, means for applying a reference voltage to one terminal of said capacitor, a digital-to-analog converter having N input terminals and an output terminal, means connecting said output terminal to the other terminal of said capacitor, and means for applying a binary word of N digits in parallel form to said input terminals, said converter including means for substantially matching the conversion characteristic of said converter to the non-linear characteristic of said capacitor.

5. In combination, a signal generator adapted to produce an output signal of differing discrete frequencies in response to a binary command word, a filter to which said output signals are applied comprising a tuned circuit including an inductor and a capacitor the capacitance of which varies in response to the voltage applied thereacross, means for applying a reference voltage to one terminal of said capacitor, a digital-to-analog converter having an output terminal connected to the other terminal of said capacitor, and means for applying said binary command word to said digital-to-analog converter whereby the resonant frequency of said filter varies in correspondence with changes in frequency of said output signal.

6. In combination, a signal generator adapted to produce an output carrier signal of differing discrete frequencies distributed throughout a range of frequencies in response to the application thereto of a binary command word, a narrow pass band filter to which said output signals are applied comprising a series resonant tuned circuit including a voltage variable capacitor as the frequency tuning element, means for applying a reference voltage to one terminal of said capacitor, a digital-to-analog converter having an output terminal connected to the other terminal of said capacitor, and means for applying said binary command word in parallel to said digital-to-analog converter, said converter being operative to produce a voltage for application to the other terminal of said capacitor to cause tuning of said tuned circuit in correspondence with changes in frequency of said output signal.

7. In combination, a signal generator adapted to produce an output carrier signal of differing discrete frequencies in response to the application thereto of a binary command word, said signal at each of said frequencies including unwanted sideband frequencies, and means for substantially eliminating said sideband frequencies comprising, a narrow pass band filter to which said output signal is applied, said filter including a series resonant circuit having a voltage variable capacitor as the tuning element, means for applying a reference voltage to one terminal of said capacitor, a digital-to-analog converter having an output terminal connected to the other terminal of said capacitor, and means for applying said binary command word in parallel to said digital-to-analog converter, said converter being operative to produce a voltage for application to said other terminal of said capacitor to cause tuning of said tuned circuit in correspondence with changes in frequency of said output carrier signal.

8. In combination, a signal generator operative to produce an output signal of differing discrete frequencies in response to the application thereto of a binary command word, a tunable filter to which said output signal is applied, said filter including a voltage variable capacitor, a digital-to-analog converter coupled to said capacitor, and means for applying a binary command word in parallel to said signal generator and to said converter.

References Cited in the file of this patent

UNITED STATES PATENTS 2,402,258 Roseby et al. ____________ June 18, 1946
2,936,428 Schweitzer ______________ May 10, 1960